United States Patent [19]

Lewis et al.

[11] 4,236,020
[45] Nov. 25, 1980

[54] CARBAMATE DEPOSIT CONTROL ADDITIVES

[75] Inventors: Robert A. Lewis, Berkeley; Lewis R. Honnen, Petaluma, both of Calif.

[73] Assignee: Chevron Research Company, San Francisco, Calif.

[21] Appl. No.: 49,519

[22] Filed: Jun. 18, 1979

Related U.S. Application Data

[63] Continuation of Ser. No. 891,879, Mar. 30, 1978, abandoned, which is a continuation-in-part of Ser. No. 801,444, May 27, 1977, abandoned, which is a continuation-in-part of Ser. No. 730,495, Oct. 7, 1976, abandoned, which is a continuation-in-part of Ser. No. 700,922, Jun. 29, 1976, abandoned, which is a continuation-in-part of Ser. No. 698,243, Jun. 21, 1976, abandoned.

[51] Int. Cl.³ .................. C07C 125/04; C10L 1/22
[52] U.S. Cl. .................................... 560/159; 44/71
[58] Field of Search ............... 560/158, 159; 44/58, 44/63, 71

[56] References Cited

U.S. PATENT DOCUMENTS

| 2,991,162 | 7/1961 | Malec ................................. 44/71 X |
| 3,359,303 | 12/1967 | Coker et al. ..................... 260/482 C |
| 3,438,757 | 4/1969 | Honnen et al. ........................ 44/58 |
| 3,454,625 | 7/1969 | Eiseman, Jr. et al. ........... 260/482 C |
| 3,652,240 | 8/1972 | Dorn et al. ......................... 44/71 X |
| 3,658,882 | 4/1972 | Eiseman, Jr. ................... 260/482 C |
| 3,671,511 | 6/1972 | Honnen et al. ..................... 44/58 X |
| 3,786,081 | 1/1974 | Oppenlaender et al. ........ 560/158 X |
| 3,813,341 | 5/1974 | Elliott et al. ................ 260/482 B X |
| 3,960,515 | 6/1976 | Honnen ............................ 44/63 X |
| 4,160,648 | 7/1979 | Lewis et al. ........................ 44/71 X |

Primary Examiner—Thomas A. Waltz
Attorney, Agent, or Firm—D. A. Newell; S. R. LaPaglia

[57] ABSTRACT

Deposit control additives for internal combustion engines are provided which maintain cleanliness of intake systems without contributing to combustion chamber deposits. The additives are poly(oxyalkylene) carbamates comprising a hydrocarbyloxy-terminated poly(oxyalkylene) chain of 2–5 carbon oxyalkylene units bonded through an oxycarbonyl group to a nitrogen atom of ethylenediamine.

10 Claims, No Drawings

CARBAMATE DEPOSIT CONTROL ADDITIVES

CROSS REFERENCE TO RELATED APPLICATIONS

This is a continuation of application Ser. No. 891,879, filed Mar. 30, 1978 now abandoned which is a continuation-in-part of U.S. application Ser. No. 801,444 of Robert A. Lewis and Lewis R. Honnen for "Deposit Control Additives" filed May 27, 1977, now abandoned, which is a continuation-in-part of U.S. Ser. No. 730,495, filed Oct. 7, 1976, now abandoned, which in turn is a continuation-in-part of Ser. No. 700,922, filed June 29, 1976, now abandoned, which in turn is a continuation-in-part of Ser. No. 698,243, filed June 21, 1976, now abandoned.

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions.

Thus, the introduction of fuel compositions containing deposit control additives has resulted in many cases in the reduction of harmful atmospheric pollutants and, since greater engine efficiencies are maintained, fuel savings.

A complicating factor has, however, recently arisen. With the advent of automobile engines that require the use of non-leaded gasolines (to prevent disablement of catalytic converters used to reduce emissions), a serious problem has arisen in providing gasoline of high enough octane to prevent knocking and the concomitant damage which it causes. The chief problem lies in the area of the degree of octane requirement increase, herein called "ORI", which is caused by deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5000 to 15,000 miles of automobile operation.

Octane requirement increases at equilibrium with commercial gasolines, in particular engines will vary from 5 or 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine.

The problem is compounded by the recently discovered fact that some of the presently used nitrogen-containing deposit control additives and the mineral oil or polymer carriers commonly used with such additives appear to contribute significantly to the ORI of engines operated on unleaded fuel.

It is, therefore, highly desirable to provide deposit control additives which effectively control deposits in intake systems (carburetor, valves, etc.) of engines operated with fuels containing them, but do not contribute to the combustion chamber deposits which cause increased octane requirements.

2. Description of the Prior Art

U.S. Pat. No. 3,359,303 discloses reaction products of polyalkyleneoxy alkyl 1-aziridine carboxylates with polyamines. These materials are disclosed as being curing agents (cross-linking agents) for epoxy resins. The alkyleneoxy chains contain a maximum of 20 alkyleneoxy units.

U.S. Pat. No. 3,658,882 discloses certain aryl carbamates and quaternary derivatives thereof useful as antistatic agents.

SUMMARY OF THE INVENTION

Deposit control additives are provided which maintain cleanliness of engine intake systems and do not themselves contribute to combustion chamber deposits. The deposit control additives are poly(oxyalkylene) carbamates soluble in a hydrocarbon fuel boiling in the gasoline range. The carbamates comprise a hydrocarbyloxy-terminated poly(oxyalkylene) chain of at least 5 oxyalkylene units containing 2 to 5 carbon atoms per oxyalkylene unit bonded through an oxycarbonyl group to a nitrogen atom of ethylenediamine. The hydrocarbyloxy group preferably will contain from 1 to 30, more preferably 2 to 20 carbon atoms. The compounds will have molecular weights in the range of about 500 to 10,000, preferably from 1200 to 5000. The poly(oxyalkylene) chain will contain sufficient oxyalkylene units other than ethyleneoxy to effect solubility in gasoline.

The preferred compounds may be described by the following general formula:

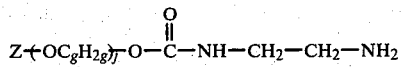

in which g is an integer 2 to 5, j is an integer such that the molecular weight of the compound is in the range of about 1200 to about 5000, Z is hydrocarbyl of 1 to 30 carbons. Sufficient of the oxyalkylene units in the compound are other than ethyleneoxy to render the compound soluble in hydrocarbon fuel boiling in the gasoline range.

The additives are usually prepared by the reaction of a suitable capped polyether alcohol with phosgene to form a chloroformate followed by reaction of the chloroformate with ethylenediamine to form the active carbamate.

DETAILED DESCRIPTION OF THE INVENTION

The Polyethers

The capped polyethers or poly(oxyalkylene) materials which are utilized in preparing the polyether amino carbamates are usually the addition polymers of the lower aliphatic oxides such as ethylene oxide, propylene oxide, the butylene oxides and the pentylene oxides. The monohydroxy polyethers are prepared by employing a suitable monohydroxy compound such as a phenol or aliphatic alcohol as an initiating material. The preferred materials are the butylene oxide and higher polymers, because they contribute higher mineral oil solubility to the additives. These materials must be terminated or capped on one end by a suitable hydrocarbyl group. For example, particularly preferred materials are capped with an alkylphenol group. The alkyl group of these alkylphenols has from 1 to 24 carbon atoms and may be branched or straight chain. One preferred alkyl group is that obtained by polymerizing propylene to an average of 4 units and has the common name of propylene tetramer. Also suitable are materials which are capped with butyl, cleyl or mixtures of alkyl groups, i.e., with a mixture of $C_{16}$, $C_{18}$ and $C_{20}$ alkyls.

The poly(oxyalkylene) alcohols are prepared by conventional methods, i.e., the oxyalkylation of a hydroxyl-containing compound, such as are disclosed in U.S. Pat. Nos. 2,841,479 and 2,782,240. In the oxyalkylation reaction, a single type of alkylene oxide may be employed, such as propylene oxide or butylene oxide. In such a case, the resulting product is a homopolymer and in that case the value of g in the general formula has a single value, for example 3 or 4. However, copolymers are equally satisfactory, and random copolymers are readily prepared by contacting the hydroxyl-containing compound with a mixture of alkylene oxides, such as a mixture of propylene and butylene oxides. In this case, g in the general formula will have two values, i.e., 3 and 4. Furthermore the oxyalkylene groups will occur in random arrangement, e.g., for g=3 and 4.

$-(OC_3H_6)-(OC_4H_8)-(OC_4H_8)-(OC_3H_6)-(O-C_4H_8)-$
or $-(OC_4H_8)-(OC_3H_6)-(OC_3H_6)-(OC_3H_6)-(OC_4H_8)-(OC_4H_8)-$

Block copolymers of oxyalkylene groups are also envisioned as satisfactory arrangements for this invention. Such copolymers are prepared by contacting the hydroxyl-containing compound with first one alkylene oxide and, then after removing any unreacted alkylene oxide from the reaction mixture, contacting said mixture with a second alkylene oxide. In this case, g of the general formula will also have two values, but all of one g are linked together and in turn are linked to all of the other g. For example, the arrangement of the groups will be as follows for g=2 and 4.

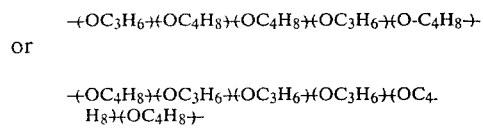

The structures of the groups identified as $-OC_gH_{2g}-$ the general formula are any of the isomeric structures well known to the organic chemist for compounds having from 2 to 5 total carbon atoms. For example, among the possible structures when g=4, i.e. $-(OC_4H_8)-$, are the following:

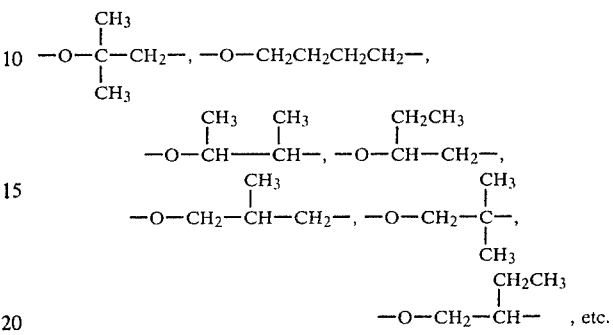

Similarly, structures can be derived for other values of g; of course, when g=2, there is only one group, i.e., $-O-CH_2CH_2-$. These various isomers are prepared by polymerizing the appropriate alkylene oxide.

The preferred compounds have the following structures:

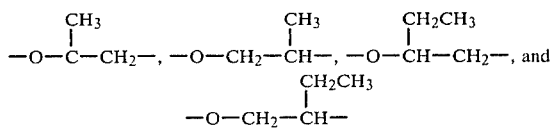

and are obtained from 1,2-propylene oxide and from 1,2-butylene oxide.

The materials may be prepared from mixture of oxide monomers, i.e. when the reactivities of the oxides are relatively equal, random polymers can be prepared. In certain cases, with ethylene oxide, in combination with other oxides, the ethylene oxide reaction rate is much greater, and random polymers cannot be easily prepared. In either case, block copolymers can be prepared.

A particular type of polymer that can be prepared is represented by materials which are prepared by polymerizing propylene oxide on a suitable monohydroxy compound to form a poly(oxypropylene)monool, and then polymerizing butylene oxide on the end of the poly(oxypropylene)monool.

Preparation of the Polyether Amino Carbamates

The additives of this invention may be most conveniently prepared, as has been previously noted, by reaction of phosgene with the monohydroxy poly(oxyalkylene) compound followed by reaction of the product with ethylene diamine.

The reaction of the poly(oxyalkylene) compound and phosgene is usually carried out on an essentially equimolar basis, although excess phosgene can be used to improve the degree of reaction. The reaction may be carried out at temperatures from −10° to 100° C., preferably in the range of 0° to 50° C. The reaction will usually be complete within ¼ to 5 hours. Times of reaction will usually be in the range of from 2 to 4 hours.

A solvent may be used in the chloroformylation reaction. Suitable solvents include benzene, toluene, etc.

The reaction of the resultant chloroformate with the amine may be carried out neat or preferably in solution. Temperatures of from −10° to 200° C. may be utilized. The desired product may be obtained by water wash and stripping, usually by the aid of vacuum, of any residual solvent.

The mol ratio of the basic amine nitrogen to polyether chloroformate will generally be in the range from about 2 to 20 mols of basic amine nitrogen per mol of chloroformate, and more usually 5 to 15 mols of basic amine nitrogen per mol of chloroformate. Since suppression of polysubstitution of the alkylene polyamines is usually desired, large mol excesses of the amine will be used. For example, in particular, preparation with ethylenediamine with a basic amine nitrogen to chloroformate ratio of 5.0 to 1 has yielded a basic nitrogen to total nitrogen ratio in the product of 0.27, whereas raising the basic amine nitrogen to chloroformate ratio to 14.2 to 1 gives 0.42 basic nitrogen to total nitrogen ratio, showing a much higher amount of monocarbamate in the material.

The reaction or reactions may be conducted with or without the presence of a reaction solvent. A reaction solvent is generally employed whenever necessary to reduce the viscosity of the reaction product. These solvents should be stable and inert to the reactants and reaction product. Preferred solvents include aliphatic or aromatic hydrocarbons. Depending on the temperature of the reaction, the particular chloroformate used, the mol ratios, as well as the reactant concentrations, the reaction time may vary from less than 1 minute to 3 hours.

After the reaction has been carried out for a sufficient length of time, the reaction mixture may be subjected to extraction with a hydrocarbon or hydrocarbon-alcohol medium to free the product from any low-molecular-weight amine salts which have formed and any unreacted ethylenediamine. The product may then be isolated by evaporation of the solvent. Small amounts of halogen may be present as the hydrohalide salt of the polyether amino carbamates.

Depending on the particular application of the composition of this invention, the reaction may be carried out in the medium in which it will ultimately find use, e.g. polyether carriers or an oleophilic organic solvent or mixtures thereof and be formed at concentrations which provide a concentrate of a detergent composition. Thus, the final mixture may be in a form to be used directly for blending in fuels.

The polyether amino carbamates will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 500 ppm of polyetheraminocarbamate per part of base fuel is needed to achieve the best results. When other detergents are present, a lesser amount of polyether amino carbamate may be used. For performance as a carburetor detergent only, lower concentrations, for example 30 to 70 parts per million may be preferred.

The deposit control additive may be formulated as a concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight and preferably from 10 to 25 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene)s; other synthetic lubricants or lubricating mineral oil. Particularly preferred carrier oils are poly(oxyalkylene) mono and polyols, such as the Pluronics marketed by BASF Wyandotte Corp., and the UCON LB-series fluids marketed by Union Carbide Corp. When used, these oils are believed to act as a carrier for the detergent and assist in removing and retarding deposits. They have been found to display synergistic effects when combined with certain polyether amino carbamates. They are employed in amounts from about 0.005 to 0.5 percent by volume, based on the final gasoline composition. In the previously described concentrate the poly(oxyalkylene) polyols are usually present in amounts of from 5 to 80 percent by weight.

The following examples are presented to illustrate specific embodiments of the practice of this invention and should not be interpreted as limitations upon the scope of the invention.

EXAMPLE 1

Preparation of Poly(oxypropylene) Chloroformate

Phosgene (298 g, 3.0 mols) was condensed into toluene (2.5 liters) at 0° C. n-Butoxy capped poly(oxypropylene)monool (5.0 kg, 2.78 mols) with a molecular weight of about 1800 was added to the phosgene solution in a rapid stream, with stirring. The mixture was stirred an additional 30 minutes after completion of the addition, and excess phosgene was removed by purging with nitrogen while the temperature rose to ambient (about 2 hours). The product showed a strong chloroformate absorption at 1790 cm$^{-1}$.

EXAMPLE 2

Reaction of Poly(oxypropylene) Chloroformate with Ethylenediamine

The chloroformate solution from Example 1 was divided in half, diluted with toluene (6 liters), and each half was added to ethylenediamine (527 g, 8.6 mol) in toluene (1 liter) at 0° C., with vigorous stirring. Immediate precipitation of ethylenediamine hydrochloride occurred. The reaction temperature was kept below 25° C. and stirring was continued for one hour after addition. n-Butanol (5 liters) was added, and the mixture was extracted with hot water (approximately 15 liters). The two batches were combined and solvent was removed on a 5-gallon rotary evaporator. The product (5050 g) contained 1.12% nitrogen and 0.46% basic nitrogen by ASTM D-2896. Infrared analysis revealed a typical carbamate absorption at 1725 cm$^{-1}$.

The polyether amino carbamates were blended in gasoline and their deposit reducing capacity tested in an ASTM/CFR Single-Cylinder Engine Test.

In carrying out the tests, a Waukesha CFR single-cylinder engine is used. The run is carried out for 15 hours, at the end of which time the intake valve is removed, washed with hexane and weighed. The previously determined weight of the clean valve is substracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table I.

The base fuel tested in the above extended detergency test is a regular octane unleaded gasoline containing no fuel detergent. The base fuel is admixed with varying amounts of deposit control additives.

TABLE I

INTAKE VALVE DEPOSIT TESTS[1]

| Additive Carrier Description | ppm | Average Washed Deposit, mg | |
|---|---|---|---|
| | | 11A Engine | 12A Engine |
| Base Fuel | — | 259[2] | 102[3] |
| PPG-1800[4] EDA Carbamate[5] | 333 | 12 | 6 |
| PPG-1800[4] | 167 | | |
| PPG-1800[4] EDA Carbamate[5] | 200 | 33 | 18 |
| PPG-1450[4] | 300 | | |

[1]Single evaluations unless noted
[2]Average of 8 runs
[3]Average of 4 runs
[4]The designation PPG-1800 refers to a monobutly-capped poly(oxypropylene) glycol of about 1800 molecular weight; PPG-1450 is 1450 molecular weight.
[5]Poly(oxypropylene) ethylene diamine carbamate prepared as in Example 2.

These data show that the additives of this invention have excellent deposit control properties.

In order to compare the compounds of this invention with compounds prepared from polyether diols, bis amino carbamates were prepared as follows:

EXAMPLE 3

Preparation of Poly(oxybutylene) Glycol 25 g (278 mmol) of 2,3-butanediol and 100 ml of toluene were placed in a 1-liter, 3-necked flask equipped with a Dean-Stark trap, reflux condenser, mechanical stirrer and a nitrogen inlet. The mixture was heated under reflux to remove trace water in the diol. After cooling, 3.25 g (80 meq) of potassium was added and the mixture was stirred until the potassium dissolved. The trap was removed and an addition funnel attached. 500 g (6.94 mol) of 1,2-butylene oxide was added slowly and the mixture was heated to reflux until the overhead temperature reached 119° C. (37 hours).

200 ml of an acidic ion-exchange resin (Bio-Rad 50W-X2) was added to the mixture and it was stirred for 1.5 hours. 200 ml of toluene was added to the mixture and water was removed by azeotropic distillation. The product was filtered to remove the resin, and the solvent was removed under reduced pressure. The resulting diol (482 g) had a hydroxyl number of 67 mg KOH/g.

EXAMPLE 4

Preparation of Poly(oxybutylene) Chloroformate 200 g of poly(oxybutylene) glycol (product of Example 3) was added to phosgene (66 g) in 150 ml of toluene at 0° C. The mixture was stirred for 2 hours at 0° C. and for 2 hours at 25° C. Excess phosgene was then removed by distillation. The resulting dichloroformate contained 7.74% chlorine (95% of theoretical) based on the hydroxyl number of the starting diol.

EXAMPLE 5

Preparation of Bis(N-aminoethyl) Carbamate of Poly(oxybutylene)

A 180-g portion of the product of Example 4 was diluted with toluene to form a 50% weight solution. Pumps were employed to meter the chloroformate solution (8 volumes) and ethylenediamine (1 volume) to a Komax Static mixing tube at a combined flow rate of 1200 ml/min. The resulting crude carbamate was purified by diluting with an equal volume of 1-butanol and washing with water (four 1000-ml portions) until the wash pH was 7. The butanol was removed under reduced pressure. The product contained 2.45% nitrogen (81% of theory based upon the chlorine content of the chloroformate). The compound is designated "Compound Y".

ASTM/CFR Single-Cylinder Engine Tests as described previously were performed on a series of additives formulated by combining the bis compound (VIII) of Example 5 with a poly(oxybutylene) ethylenediamine carbamate (Compound Z) in which the poly(oxybutylene) is capped with an alkylphenol group. The molecular weight of the capped polymer was 1475. The compound was prepared in essentially the same manner as set forth in Examples 1 and 2. Table II sets forth these data.

TABLE II

Intake Valve Deposit Tests on Combinations of Poly(oxybutylene) Amino Carbamates and Poly(oxybutylene) Amino Dicarbamates

| Run | Total Additive, ppm | Y, ppm | Z, ppm | Average Washed Deposits, mg. | |
|---|---|---|---|---|---|
| | | | | 11a Engine | 12a Engine |
| 1 | 0 | 0 | 0 | 127[1] | 162[1] |
| 2 | 300 | 300 | 0 | 26[2] | 10[2] |
| 3 | 320 | 300 | 20 | 62 | 26 |
| 4 | 340 | 300 | 40 | 180[2] | 65[2] |
| 5 | 375 | 300 | 75 | 117[2] | 76 |
| 6 | 30 | 0 | 300 | 643 | 653 |

[1]Average of 8 runs
[2]Average of 2 runs

These data show that the amino dicarbamates are severely detrimental to deposit control characteristics in fuels.

The tendency of the additives to contribute to ORI was evaluated in a laboratory engine test. The test engine is a CLR single-cylinder, balanced, high-speed, four-cycle engine designed primarily for oil test and research work. It is manufactured by the Laboratory Equipment Corporation of Mooresville, Indiana. The major engine dimensions are:

| Bore | 3.80 In. |
| Stroke | 3.75 In. |

-continued

| | |
|---|---|
| Displacement | 42.5 Cu. In. |
| Compression Ratio | 8:1 |

The carburetor, intake manifold, and distributor have been slightly modified to facilitate our test procedure. These modifications have made the engine's ORI characteristics comparable to modern day automobiles.

The test procedure involves engine operation for 80 hours (24 hours a day) on a prescribed load and speed schedule representative of typical vehicle driving conditions. The cycle for engine operation during the test is as follows:

TABLE III

Deposit Accumulation Cycle CLR Single Cylinder

| | Mode | Time in Mode, Sec. | Manifold Vacuum, In. Hg | Engine Speed, rpm |
|---|---|---|---|---|
| 1. | Idle | 140 | 16 | 900 |
| 2. | Heavy Cruise, Low Speed | 70 | 7 | 2000 |
| 3. | Light Cruise, Low Speed | 140 | 13 | 2000 |
| 4. | Deceleration | 140 | 18 | 1800 |
| 5. | Heavy Cruise, Low Speed | 70 | 7 | 2000 |
| 6. | Light Cruise, Low Speed | 140 | 13 | 2000 |
| 7. | Idle | 210 | 16 | 900 |
| 8. | Heavy Cruise, Low Speed | 70 | 7 | 2000 |
| 9. | Light Cruise, Low Speed | 70 | 13 | 2000 |
| 10. | Heavy Cruise, High Speed | 70 | 9 | 2500 |
| 11. | Light Cruise, High Speed | 140 | 15 | 2500 |
| 12. | Deceleration | 140 | 18 | 1800 |

All of the test runs were made with the same base gasoline, which was representative of commercial unleaded fuel. The results are set forth in Table IV.

TABLE IV

Laboratory ORI Test Results

| Additive, Carrier Description | Concentration, ppm | Combustion Chamber Deposits, q | Δ |
|---|---|---|---|
| — | — | — | 3.4 |
| Commercially available nitrogen-containing DC additive | 467 | — | 7.1 |
| Mineral carrier oil | 1600 | | |
| PPG-1800 EDA Carbamate* | 286 | 1.3 | 2.5 |
| PPG-1450* | 214 | | |
| PPG-18000 EDA Carbamate* | 286 | 1.6 | 2.4 |
| PPG-1450* | 214 | | |

*See Table I

Simple arithmetic averages of the results indicate: base fuel gives an ORI of 3.1 and combustion chamber deposits weighing 1.3 g, the commercial additives averaged 6.3 units ORI and had combustion chamber deposits weighing 2.1 g, and the polyether carbamates gave an ORI of 2.5 and combustion chamber deposits averaging 1.5 g. Generally, these results indicate that the polyether carbamates, which have been demonstrated to be excellent inlet system deposit control additives, do not contribute significantly to increasing octane requirements (over base fuel) of the engines in which they are employed.

The test for evaluating the ability of fuel additives to control carburetor deposits employs a 1973 model year, 240 CID, 6-cylinder Ford engine. The internal bore of the carburetor throttle body is equipped with a thin, removable aluminum sleeve. The difference between sleeve weights determined before and after an engine run represents the change in amount of surface deposit occurring during that run.

For additive evaluation, two test phases are run as set forth in Table V.

TABLE V

Carburetor Deposit Test Procedure

1. Dirty-Up Phase (Starting with Clean Sleeve)

| | |
|---|---|
| Objective: | Establish deposits on carburetor sleeve. |
| Duration: | 15 hours. |
| Operating Cycle: | 7 minutes moderate load and speed, 4 minutes idle. |
| Engine Setup: | Crankcase blowby gases routed to carburetor air inlet. |
| Fuel: | Deposit-forming fuel containing heavy FCC component. |
| Evaluation: | Sleeve weights are determined at the beginning and end of the dirty-up phase, and sleeve deposits are rated visually on a scale of 0 to 10 (10 = clean). |

2. Cleanup Phase (Begins with sleeve Deposits Formed During Dirty-Up Phase)

| | |
|---|---|
| Objective: | Measure additive performance in cleaning up deposits. |
| Duration: | 4 hours. |
| Operating Cycle: | Same as dirty-up phase. |
| Engine Setup: | Crankcase blowby gases diverted from carburetor inlet-EGR shutoff. |
| Fuel: | Commerical-type gasoline containing additive under test. |
| Evaluation: | The sleeve is reweighed and rerated visually. Differences between initial and final values represent additive effectiveness. |

Table V presents average values for the performance of PPG-amine carbamate additives. Also, presented are values for a commercial deposit control additive having recognized performance in the field. Deposit level changes with a commercial-type unleaded gasoline without additive are also shown.

TABLE VI

Carburetor Test Results

| | | | Average Additive Performance | | |
|---|---|---|---|---|---|
| | Runs | Concentration, ppm | Deposit Weight Reduction, % | Visual Deposit Ratings[1] | |
| | | | | Initial Final | Δ |
| PPG-1800 EDA Carbamate[1] | 4 | 200 | 88 | 4.9[3] → 8.1[3] | 3.2[3] |
| Commercial Additive | 8 | 150 | 91 | 5.3 → 8.4 | 3.1 |
| None | 2 | — | 63 | 4.6 → 6.0 | 1.4 |

[1]Visual Deposit rating (10 = clean); see Table I
[2]Similar to product of Example 4
[3]Data for 3 runs only These data show that the polyether carbamates are as effective carburetor deposit control additives as the recognized commercial additive.

The previously mentioned U.S. Pat. No. 3,359,303 discloses compounds similar in structure to the current compounds. However, by their nature they are limited to amines containing at least two alkylene groups, e.g., the derivative of diethylenetriamine. It has been found that the ethylenediamine derivative of this invention shows unexpectedly superior water-tolerance properties, an important consideration for use in fuels.

The following table shows the comparative water-tolerance properties for the ethylenediamine and diethylenetriamine compounds. Also, the water-tolerance properties of the 1,2-propylenediamine and di-(1,2-propylene) triamine derivatives are shown. The polyether in each case was butyl-capped polyoxypropylene material having a molecular weight of about 1483 and containing 25 oxypropylene units. The water-tolerance test is a modified Enjay Waring Blender Haze Test wherein 300 ml of fuel and 3 ml of water are mixed at 13,000 rpm for 30 seconds. The samples of both the water and fuel phases are rated from 1 to 5. For the water phase, 1 indicates free water after 30 minutes; 5 is total emulsion at 20 hours. For the fuel phase, 1 is bright and clear; 5 is extreme haze (no light passing through bottle). A rating of 3 is considered a marginal pass. The tests were run with and without a commercial demulsifier. The demulsifier was used at 5 ppm concentration. Table VII shows the results with and without demulsifier.

TABLE VII

| Water Tolerance of Polyether Carbamate | | | |
|---|---|---|---|
| | Water | Fuel Phase | |
| Amine | Phase | 3 hrs | 20 hrs |
| Ethylenediamine | 3 | 2 | 1 |
| Ethylenediamine* | 1 | 3 | 1 |
| Diethylenetriamine | 3 | 4 | 1 |
| Diethylenetriamine* | 1 | 4 | 1 |
| 1,2-Propylenediamine | 1 | 2 | 1 |
| 1,2-Propylenediamine* | 1 | 3 | 1 |
| di-(1,2-propylenetriamine) | 1 | 2 | 1 |
| di-(1,2-propylenetriamine)* | 1 | 3 | 1 |

*Contains 5 ppm of commercial demulsifier

This shows that the ethylenediamine derivative is surprisingly superior to the diethylenetriamine derivative. Note that the propylenediamine and dipropylenetriamines were equivalent. Note also that the diethylenetriamine derivative fails to pass even with a demulsifier present.

All specific embodiments of the invention have been described in detail, and it should be understood that the invention is to be given the broadest possible interpretation within the terms of the following claims.

What is claimed is:

1. Compounds suitable for use as deposit control additives in internal combustion engines which comprise poly(oxyalkylene) carbamates having a $C_1$-$C_{30}$ hydrocarbyloxy-terminated poly(oxyalkylene) chain of at least 5 oxyalkylene units, each unit containing 2 to 5 carbon atoms, said chain being bonded through an oxycarbonyl group to a nitrogen atom of ethylenediamine, and said poly(oxyalkylene) chain containing sufficient oxyalkylene units other than ethyleneoxy to render said compounds soluble in gasoline, and said compounds having molecular weights in the range of 500 to 10,000.

2. The compounds of claim 1 having a molecular weight of from about 1,200 to 5,000.

3. The compounds of claim 1 wherein the oxyalkylene units contain 3 or 4 carbon atoms.

4. The compounds of claim 3 wherein the oxyalkylene units are oxybutylene.

5. The compounds of claim 2 wherein the group terminating the poly(oxyalkylene) chain is a hydrocarbyloxy group containing from 2 to 20 carbon atoms.

6. The compounds of claim 4 wherein the hydrocarbyloxy group is butoxy.

7. The compounds of claim 2 wherein the hydrocarbyloxy group is an alkylphenoxy group having from 7 to 30 carbon atoms.

8. The compounds of claim 7 wherein the alkyl group in said alkylphenoxy is propylene tetramer.

9. Compounds of the formula:

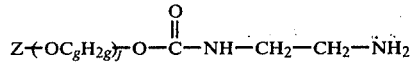

in which g is an integer 2 to 5, j is an integer such that the molecular weight of the compounds are in the range of about 1200 to about 5,000, Z is a hydrocarbyl group of 1 to 30 carbon atoms, and sufficient of the oxyalkylene units in the compounds are other than ethyleneoxy to render the compounds soluble in hydrocarbon fuels boiling in the gasoline range.

10. Compounds of claim 9 in which g is 4.

* * * * *